United States Patent [19]

Muller

[11] Patent Number: 5,005,265

[45] Date of Patent: Apr. 9, 1991

[54] TWO-PIECE STUD ASSEMBLY

[75] Inventor: John Muller, Englewood, Tenn.

[73] Assignee: Lavidson Textron Inc., Dover, N.H.

[21] Appl. No.: 458,334

[22] Filed: Dec. 28, 1989

Related U.S. Application Data

[63] Continuation of Ser. No. 221,886, Jul. 20, 1988, abandoned.

[51] Int. Cl.⁵ .............................................. A44B 1/04
[52] U.S. Cl. ......................................... 24/453; 24/297;
24/289; 411/508; 411/913; 411/908; 248/221.4;
248/27.3
[58] Field of Search ................. 24/453, 297, 625, 459,
24/616, 289; 411/508, 509, 510, 512, 913, 108;
248/221.3, 221.4, 27.3, 74.2, 74.3

[56] References Cited

U.S. PATENT DOCUMENTS

| 2,698,557 | 1/1955 | Harper | 411/508 X |
| 2,713,284 | 7/1955 | Bedford | 411/508 |
| 4,012,155 | 3/1977 | Morris | 24/625 X |
| 4,765,036 | 8/1988 | Iguchi et al. | 24/289 |
| 4,796,339 | 1/1989 | Burke | 24/297 X |

FOREIGN PATENT DOCUMENTS

| 2921956 | 12/1980 | Fed. Rep. of Germany | 24/625 |
| 1111742 | 3/1956 | France | 24/625 |
| 639503 | 5/1962 | Italy | 24/297 |
| 1379735 | 1/1975 | United Kingdom | 24/625 |

Primary Examiner—Laurie K. Cranmer
Attorney, Agent, or Firm—John C. Evans

[57] ABSTRACT

A self-licking stud assembly including male and female segaments. The male segment includes a base for mounting or being integrally molded on a panel member to be joined with a second panel member in a side-by-side relationship, a central stem extending from teh base, with a plurality of equally spaced deflectable fingers formed on the end thereof so as to extend outwardly and toward the base. The female segment includes a base for mounting or being integrally molded on the second panel member, a flange or collar formed on one side of the base, and an opening through the base and the collar, with a frustoconically shaped surface formed on the inner surface of the collar. The outer edges of the fingers are selectively shaped to lockingly cooperate with the frustoconically shaped surface once the fingers are urged through the opening.

5 Claims, 2 Drawing Sheets

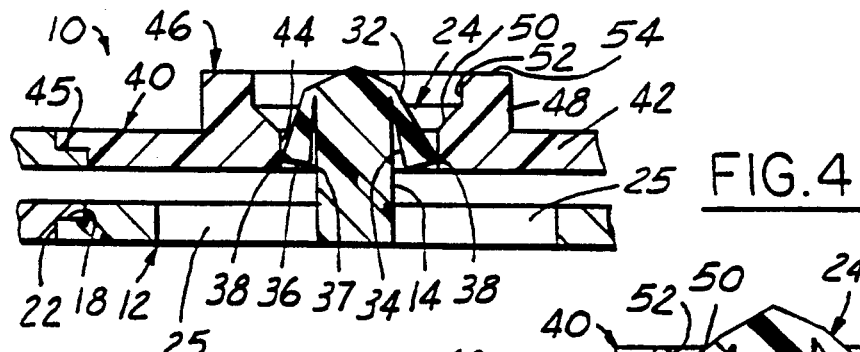
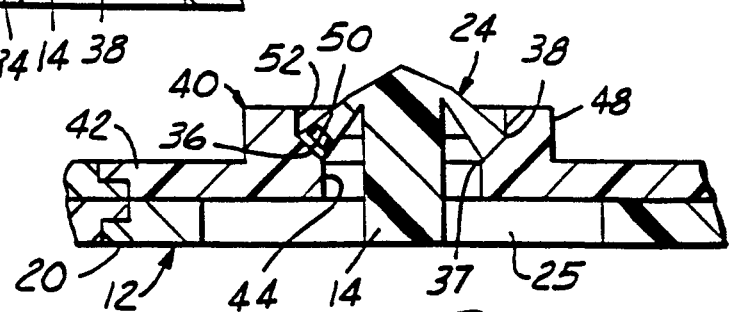
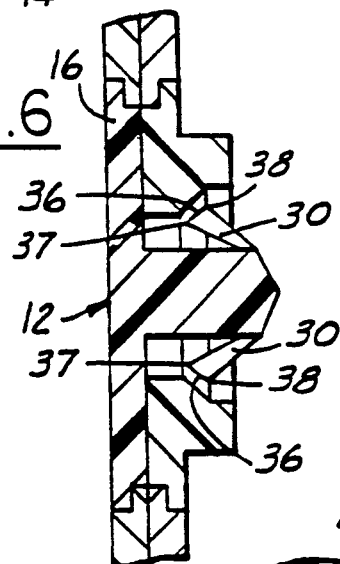
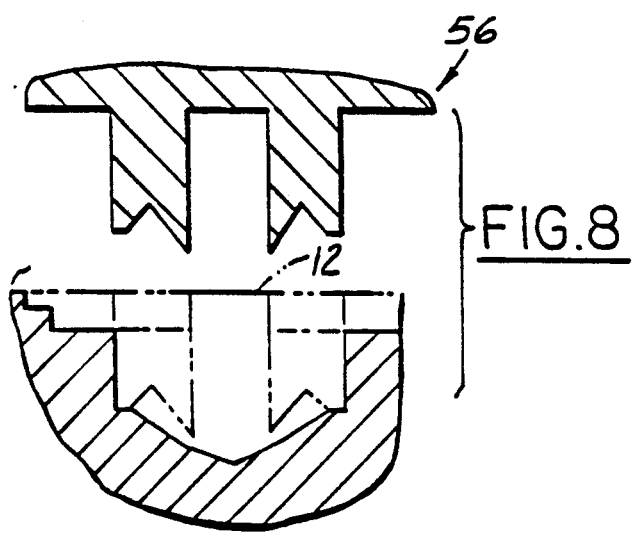
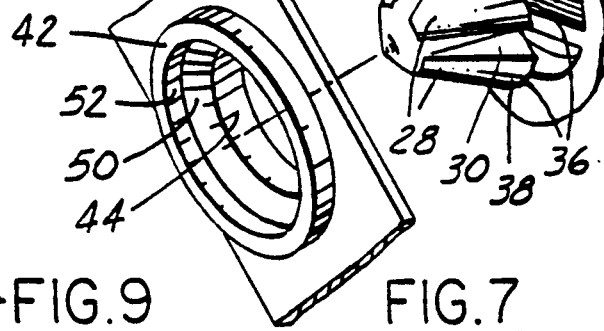
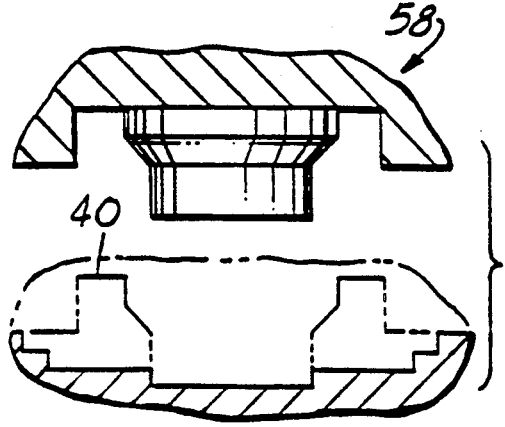

TWO-PIECE STUD ASSEMBLY

This is a continuation of application Ser. No. 221,886, filed Jul. 20, 1988, now abandoned.

TECHNICAL FIELD

This invention relates generally to fastener mechanisms and, more particularly, to a two-piece, self-locking stud assembly.

BACKGROUND ART

Heretofore, fasteners with deflectable fingers have been known and used. Specifically, U.S. Pat. No. 2,585,285 discloses a stud-like fastener having a pair of prongs with enlarged end portions, in a normal spread-apart relationship. While being inserted through an opening, the prongs are urged together until the enlarged ends exit from the opening to spring outwardly and retain the fastener in place.

U.S. Pat. No. 4,422,276 discloses a stud fastener including a series of flexible retention fins engageable with an opening in a mating part.

U.S. Pat. No. 3,162,086 illustrates a fastener including an annular flange having a cone-shaped cover, with tapered ribs formed on the outer surface thereof. Enlarged abutments formed on the ends of the ribs serve to retain the fastener in an opening formed in a panel member.

U.S. Pat. No. 3,905,270 discloses a one-piece fastening element having a shank comprising three spring legs united at the ends thereof to form a rounded piloting end.

U.S. Pat. No. 4,635,325 covers a fastener having resilient coupling members at the opposite ends of a strut member. Each coupling member includes a support member having a stem portion extending therefrom, with two arm portions formed on the end of the stem and extending toward the support member, and thin wall portions connecting the ends of the arms with the support member.

DISCLOSURE OF THE INVENTION

A general object of the invention is to provide an improved two-piece, self-locking stud assembly.

Another object of the invention is to provide an improved stud assembly having cooperating male and female components which are secured to or integrally molded on respective members to be joined in an abutting side-by-side relationship.

A further object of the invention is to provide a two-piece stud assembly wherein a male segment thereof includes a base having a central stem extending therefrom, with a plurality of equally spaced deflectable fingers formed on the end thereof so as to extend outwardly and toward the base. The outer edges of the fingers are selectively shaped to lockingly cooperate with a frustoconically shaped surface formed in a collar portion of the female segment.

A still further object of the invention is to provide a two-piece stud assembly wherein lack of the two parts thereof are shaped so as to be able to be molded in a simple line of draw, without requiring lifters or slides.

These and other objects and advantages will become more apparent when reference is made to the following drawings and the accompanying description.

BRIEF DESCRIPTION OF THE DRAWINGS

FIG. 4 is cross-sectional view of the two-piece stud assembly illustrating an intermediate assembly step involved in the assembly process;

FIG. 5 is a cross-sectional view of the two-piece stud assembly in a completely assembled condition;

FIG. 6 is a cross-sectional view of the assembled two-piece stud assembly, as taken along the plane of the line 6—6 of FIG. 2 while in an assembled condition, and looking in the direction of the arrows;

FIG. 7 is a perspective view of the two-piece stud assembly similar to the FIG. 3 separated condition;

FIGS. 8 and 9 are cross-sectional views of molds suitable for molding the male and female segments of the two-piece stud assembly invention.

BEST MODE OF CARRYING OUT THE INVENTION

Figure 1:
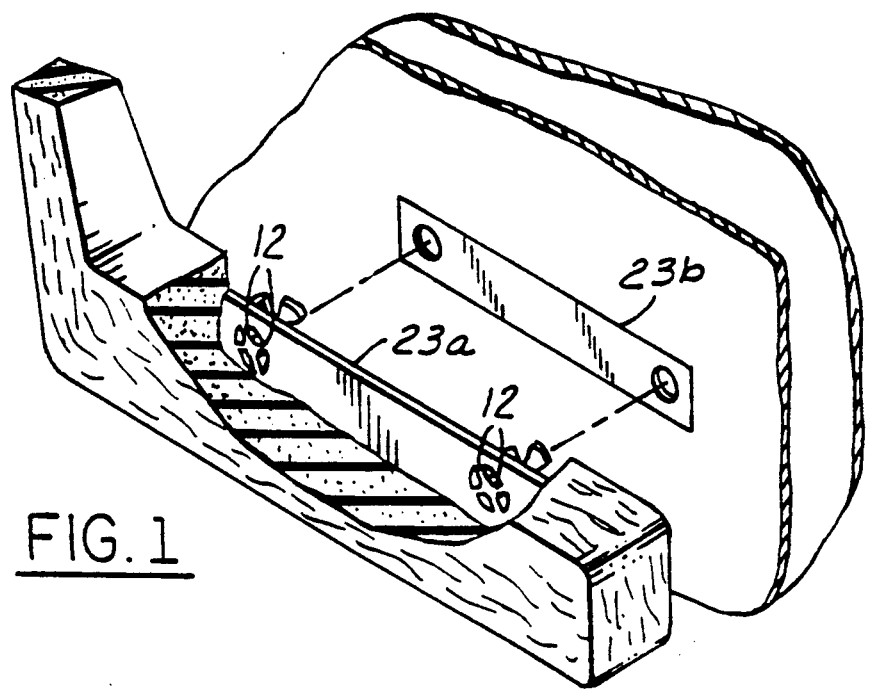
FIG. 1 is a perspective view of two to be joined and two components of the inventive fastening means.
Figure 2:
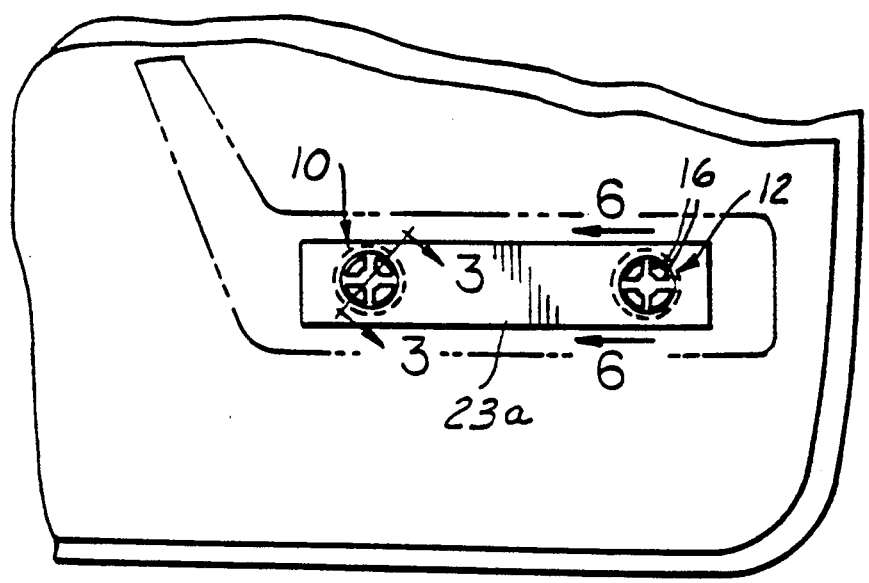
FIG. 2 is a side view of one of the members illustrated in FIG. 1.
Figure 3:
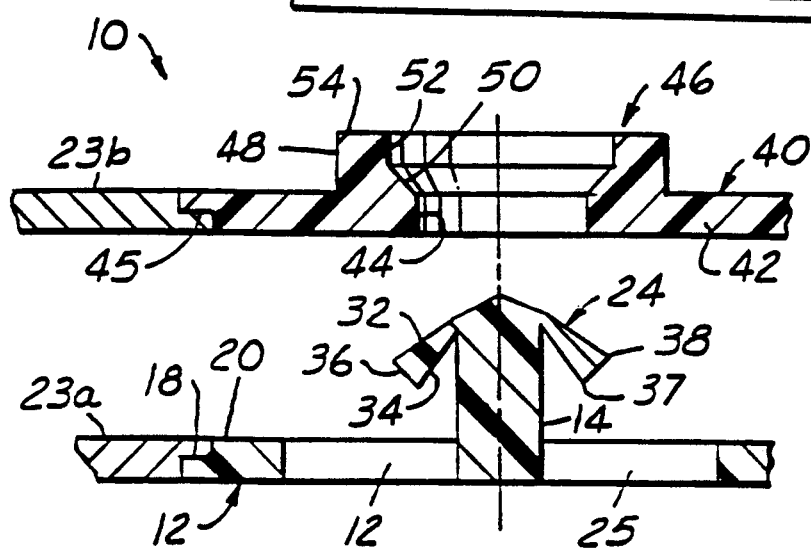
FIG. 3 is a cross-sectional view of the two-piece stud assembly invention in a separated condition, and taken along the plane of the line 3—3 of FIG. 2 and looking in the direction of the arrows.

Referring to the drawings in greater detail, the self-locking stud assembly 10 is a two-part male and female system, as illustrated in FIGS. 1-3. The male segment 12 includes a central stem 14 having a base of four radially extending spoke members 16 (FIGS. 1, 2 and 6), with a step 18 formed on the upper side 20 of a peripheral ring 22 formed around the distal ends of the suitable configuration may be utilized for mating with a similar configuration formed on the member, represented at 23a, being fastened to an adjacent member, represented at 23b. The male segment 12 may be secured in any suitable manner at 18 to the member 23a, or, alternatively, the segment 12 may be integrally molded with the member 23a.

At the other end of the central stem 14, four equally spaced, deflectable fingers 24 extend outwardly and downwardly therefrom, toward the triangular spaces 25 intermediate the four respective base spoke members 16. The fingers 24 are connected at an inboard end 24a thereof to the central stem 14 and are movable into substantial parallelism with an outer surface 14a of the central stem 14 so as to cause a center line 24b of the fingers 24 to be substantially parallel to the center line 14b of the central stem 14 at assembly, as shown in FIG. 4. As assembled, the center line 24b is approximately 45° with respect to the center line 14b of central stem 14 as shown in FIG. 5.

More specifically, each finger 24 is a progressively outwardly widening extension (FIG. 7), with gradually widening side surfaces or edges 30 diverging outwardly from the central stem 14. The center line of each side surface 30 is approximately at a 45 degree relationship with the center line of the stem 14, while the latter is in its free state. The side surfaces 30 join top, bottom and distal end surfaces 32, 34 and 36, respectively, each of which is a segment of a cone, with the surface 36 having concentric inner and outer edges 37 and 38.

The cooperating female segment 40 (FIG. 3) includes a base 42 having an opening 44 formed therethrough. A stepped or other suitably shaped portion 45 formed on the peripheral edge of the base 42 serves to mount the female segment 40 on the member 23b. Alternatively, the segment 40 may be integrally molded with the member 23b. A flange or collar 46 having a cylindrical outer surface 48 is formed on one side of the base 42, around the opening 44. The inner surface of the flange or collar 46 includes a first frustoconical surface 50 extending from the opening 44, and a cylindrical inner surface 52 extending from the frustoconical portion 50. The cylindrical inner surface 52 is concentric with the cylindrical outer surface 48, and interconnected by a flat annular end surface 54.

As may be noted in FIGS. 3-5, at assembly the outer surface 28 formed by the four fingers 24 first engages the edge of the opening 44. As the male segment 12 is urged into operative engagement with the female segment 40, the four fingers 24 are caused to deflect downwardly from their approximately 45 degrees starting condition, with the inner surfaces of each finger approaching the outer surface of the central stem 14 (FIG. 4), While the outer edges 38 thereof pass through the opening 44.

Once past the inner edge of the opening 44, the fingers 24 snap outwardly to their free condition (FIG. 5), such that their respective peripheral surfaces 36 become seated on the frustoconical surface portion 50 of the flange or collar 46, to thereby cause the male segment 12 to become interlocked with the female segment 40, as illustrated in FIGS. 5 and 6. As may be noted in FIG. 6, the respective inner and outer edges 37 and 38 of the distal end surface 36 are aligned with the respective upper and lower edges of the opening 44 and the cylindrical inner surface 52.

Referring now to the FIGS. 8 and 9, there is illustrated a molding concept, wherein each of the male 12 and female 40 segments of the self-locking stud assembly 10 are molded in a simple line of draw, without requiring lifters or slides. Each of the male 12 and female 40 segments is shown in phantom lines relative to respective ejector sleeves, represented at 56 and 58.

INDUSTRIAL APPLICABILITY

It should be apparent that the invention provides a novel two-piece, self-locking stud assembly adaptable to being integrally molded with, or mounted in any suitable manner on adjacent members that are to be retained in a side-by-side relationship.

It should also be apparent that the invention provides a two-piece locking stud which is readily molded in line of draw without the need for lifters or slides.

While but one embodiment of the invention has been shown and described, other modifications thereof are possible within the scope of the following claims.

The embodiments of the invention in which an exclusive property or privilege is claimed are defined as follows:

1. A two-piece, self-locking stud assembly comprising a male segment including a base portion, a rigid stem extending therefrom and having an outer surface and a distal end, and a plurality of equally spaced deflectable fingers, each having an inboard end connected to the distal end of said rigid stem and an axis extending downwardly therefrom at a predetermined angle with respect to said rigid stem toward said base portion; and a female segment including a base portion having an opening formed therethrough, a flange formed on one side of said base portion around said opening, a frustoconical surface formed in said flange adjacent said opening, and a cylindrical surface formed in said flange adjacent said frustoconical surface, said deflectable fingers movable so as to approach said outer surface of said rigid stem while passing through said opening and thereafter returning back to said predetermined angle to become abutted against and locked on said frustoconical surface.

2. The two-piece, self-locking stud assembly described in claim 1, wherein said base portion of said male segment comprises a plurality of radially extending spoke members, and a peripheral ring formed around said spoke members.

3. The two-piece, self-locking stud assembly described in claim 1, wherein each of said plurality of equally spaced deflectable fingers is a progressively outwardly widening extension, having top, bottom and distal end surfaces which are segments of cones, said distal end conical surface serving to match said frustoconical surface of said female segment when in its free state.

4. The two-piece, self-locking stud assembly described in claim 1, said rigid stem and said deflectable fingers each having a center line, said predetermined angle between the center line of said rigid stem and the center line of each of said deflectable fingers is approximately 45 degrees when said fingers are in their free state before and after passing through said opening.

5. The two-piece, self-locking stud assembly described in claim 1, wherein the male and female base portions are adopted to being mounted in any suitable manner or integrally molded on respective panel members which are to be retained in a side-by-side relationship.

* * * * *